United States Patent
Ito et al.

(10) Patent No.: US 6,522,557 B2
(45) Date of Patent: Feb. 18, 2003

(54) INVERTER DEVICE

(75) Inventors: Masayasu Ito, Shizuoka-ken (JP); Hitoshi Takeda, Shizuoka-ken (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 10/117,562

(22) Filed: Apr. 5, 2002

(65) Prior Publication Data

US 2002/0145887 A1 Oct. 10, 2002

(30) Foreign Application Priority Data

Apr. 9, 2001 (JP) ........................................ 2001-109566

(51) Int. Cl.$^7$ ........................... H02M 1/14; H02M 3/335
(52) U.S. Cl. .......................... 363/41; 363/17; 363/56.02
(58) Field of Search .......................... 363/17, 41, 56.02, 363/132, 98

(56) References Cited

U.S. PATENT DOCUMENTS

| | | | |
|---|---|---|---|
| 5,705,898 A | | 1/1998 | Yamashita et al. ........... 315/308 |
| 6,069,458 A | * | 5/2000 | Takehara et al. ............. 315/219 |
| 6,160,361 A | * | 12/2000 | Giannopoulos et al. ..... 315/307 |
| 6,316,882 B1 | * | 11/2001 | Choi et al. ................... 315/225 |
| 6,396,722 B2 | * | 5/2002 | Lin .............................. 363/17 |

OTHER PUBLICATIONS

Japanese laid open utility model application H6–9097 published on Feb. 4, 1994, 15 pages.

* cited by examiner

Primary Examiner—Bao Q. Vu
(74) Attorney, Agent, or Firm—Rosenthal & Osha L.L.P.

(57) ABSTRACT

An inverter device includes a series circuit having first and second switch units connected in series and a pulse signal generator for generating a pulse signal, and supplies an alternating voltage to a load by alternately driving the first and second switch units to be turned on and off in accordance with the pulse signal while a direct voltage is applied to the series circuit. The inverter device further includes: a first driving controller for generating a first driving signal and for driving the first switch unit based on the first driving signal, the first driving signal rising with the first speed at a rising of the pulse signal in a direction for turning on the first switch unit and falling with the second speed higher than the first speed at a falling of the pulse signal in a direction for turning off the first switch unit; and a second driving controller for generating a second driving signal and for driving the second switch unit based on the second driving signal, the second driving signal falling with the third speed at the rising of the pulse signal in the direction for turning on the first switch unit and rising with the fourth speed at the falling of the pulse signal in the direction for turning off the first switch unit, the third and fourth speeds being between the first and second speeds.

9 Claims, 10 Drawing Sheets

INVERTER DEVICE

This patent application claims priority from a Japanese patent application No. 2001-109566 filed on Apr. 9, 2001, the contents of which are incorporated herein by reference.

BACKGROUND OF THE INVENTION

1. Field of the Invention

The present invention relates to an inverter device. More particularly, the present invention relates to an inverter device in which two switching devices are connected in series and which supplies an alternating power generated at a connection point of these two switching devices to a load.

2. Description of the Related Art

The inverter device changes a direct voltage of a power source to an alternating voltage and supplies the alternating voltage to the load. An exemplary application of the inverter device is lighting equipment using a discharge lamp such as a metal halide lamp as a light source.

As the inverter device, an inverter device including a plurality of switching devices arranged to form a half-bridge arrangement and an inverter device including the switching devices arranged to form a full-bridge arrangement are known. In these bridge arrangements, a situation where all the switching devices are in an simultaneous-on-state may occur. This situation easily occurs when the respective switching devices are switched from an on state to an off state or from the off state to the on state. This situation causes the degradation of electrical efficiency and abnormal heat generation.

For example, Japanese Utility Model Application Laid-Open No. 6-9097 describes a structure for generating dead time in a pulse signal generator for generating a pulse signal, in order to prevent the aforementioned situation.

However, the structure for generating the dead time in the pulse signal generator is complicated. Moreover, the required number of parts is large.

SUMMARY OF THE INVENTION

Therefore, it is an object of the present invention to provide an inverter device, which is capable of overcoming the above drawbacks accompanying the conventional art. The above and other objects can be achieved by combinations described in the independent claims. The dependent claims define further advantageous and exemplary combinations of the present invention.

According to the first aspect of the present invention, an inverter device, including a first series circuit having first and second switch units connected in series and a pulse signal generator operable to generate a pulse signal, for supplying an alternating voltage to a load by alternately driving the first and second switch units to be turned on and off in accordance with the pulse signal while a direct voltage is applied to the first series circuit, the inverter device comprises: a first driving controller operable to generate a first driving signal and to drive the first switch unit based on the first driving signal, the first driving signal rising with a first speed at a rising of the pulse signal in a direction for turning on the first switch unit and falling with a second speed at a falling of the pulse signal in a direction for turning of the first switch unit, the second speed being higher than the first speed; and a second driving controller operable to generate a second driving signal and to drive the second switch unit based on the second driving signal, the second driving signal falling with a third speed at the rising of the pulse signal in the direction for turning on the first switch unit and rising with a fourth speed at the falling of the pulse signal in the direction for turning off the first switch unit, the third and fourth speeds being between the first and second speeds.

The load may be connected between the first and second switch units at one end and is connected to a reference potential at the other end.

The first driving controller may include a resistor element provided on a line of the pulse signal and a capacitor element connected between the resistor element and the first switch unit at one end; the second driving controller may include a resistor element provided on the line of the pulse signal and a capacitor element connected between the resistor element of the second driving controller and the second switch unit at one end; and a first product of an equivalent resistance value of the resistor element of the first driving controller with respect to an electric current seen from the direction for turning on the first switch unit and a capacitance of the capacitor element may be larger than a second product of an equivalent resistance value of the resistor element of the second driving controller with respect to an electric current seen from the direction for turning off the second switch unit and a capacitance of the capacitor element.

The first driving controller may include a resistor element provided on a line of the pulse signal and a capacitor element connected between the resistor element and the first switch unit at one end; the second driving controller may include a resistor element provided on the line of the pulse signal and a capacitor element connected between the resistor element of the second driving controller and the second switch unit at one end; and a third product of an equivalent resistance value of the resistor element of the first driving controller with respect to an electric current seen from the direction for turning off the first switch unit and a capacitance of the capacitor element may be smaller than a fourth product of an equivalent resistance value of the resistor element of the second driving controller with respect to an electric current seen from the direction for turning on the second switch unit and a capacitance of the capacitor element.

The first switch unit may include a first main switch and a first switch driving unit operable to drive the first main switch in accordance with the first driving signal, and the second switch unit may include a second main switch and a second switch driving unit operable to drive the second main switch in accordance with the second driving signal.

The inverter device may further comprise: a second series circuit, arranged in parallel to the first series circuit, including a third switch unit and a fourth switch unit; a third driving controller operable to generate a third driving signal based on the pulse signal and to drive the third switch unit based on the second driving signal, the third driving signal falling with the third speed at the rising of the pulse signal in the direction for turning on the first switch unit and rising with the fourth speed at the falling of the pulse signal in the direction for turning off the first switch unit; and a fourth driving controller operable to generate a fourth driving signal and to drive the fourth switch unit based on the first driving signal, the fourth driving signal rising with the first speed at the rising of the pulse signal in the direction for turning on the first switch unit and falling with the second speed at the falling of the pulse signal in the direction for turning off the first switch unit, wherein the load is connected between the first and second switch units at one end and is connected between the third and fourth switch units at the other end, and a pair of the first and fourth switch units and a pair of the second and third switch units are alternately driven to be turned on and off in accordance with the first, second, third and fourth driving signals.

The first driving controller may include a resistor element provided on a line of the pulse signal and a capacitor element connected between the resistor element and the first switch unit at one end; the second driving controller may include a resistor element provided on the line of the pulse signal and a capacitor element connected between the resistor element of the second driving controller and the second switch unit at one end; the third driving controller may include a resistor element provided on the line of the pulse signal and a capacitor element connected between the resistor element of the third driving controller and the third switch unit at one end; the fourth driving controller may include a resistor element provided on the line of the pulse signal and a capacitor element connected between the resistor element of the fourth driving controller and the fourth switch unit at one end; a first product of an equivalent resistance value of the resistor element of the first driving controller with respect to an electric current seen from the direction for turning on the first switch unit and a capacitance of the capacitor element of the first driving controller may be larger than a second product of an equivalent resistance value of the resistor element of the second driving controller with respect to an electric current seen from the direction for turning off the second switch unit and a capacitance of the capacitor element of the second driving controller; and a third product of an equivalent resistance value of the resistor element of the fourth driving controller with respect to an electric current seen from the direction for turning on the fourth switch unit and a capacitance of the capacitor element of the fourth driving controller may be larger than a fourth product of an equivalent resistance value of the resistor element of the third driving controller with respect to an electric current seen from the direction for turning off the third switch unit and a capacitance of the capacitor element of the third driving controller.

The first driving controller may include a resistor element provided on a line of the pulse signal and a capacitor element connected between the resistor element and the first switch unit at one end; the second driving controller may include a resistor element provided on the line of the pulse signal and a capacitor element connected between the resistor element of the second driving controller and the second switch unit at one end; the third driving controller may include a resistor element provided on the line of the pulse signal and a capacitor element connected between the resistor element of the third driving controller and the third switch unit at one end; the fourth driving controller may include a resistor element provided on the line of the pulse signal and a capacitor element connected between the resistor element of the fourth driving controller and the fourth switch unit at one end; a fifth product of an equivalent resistance value of the resistor element of the first driving controller with respect to an electric current seen from the direction for turning off the first switch unit and a capacitance of the capacitor element of the first driving controller may be smaller than a sixth product of an equivalent resistance value of the resistor element of the second driving controller with respect to an electric current seen from the direction for turning on the second switch unit and a capacitance of the capacitor element of the second driving controller; and a seventh product of an equivalent resistance value of the resistor element of the fourth driving controller with respect to an electric current seen from the direction for turning off the fourth switch unit and a capacitance of the capacitor element of the fourth driving controller may be smaller than an eighth product of an equivalent resistance value of the resistor element of the third driving controller with respect to an electric current seen from the direction for turning on the third switch unit and a capacitance of the capacitor element of the third driving controller.

The first switch unit may include a first main switch and a first switch driving unit operable to drive the first main switch in accordance with the first driving signal; the second switch unit may include a second main switch and a second switch driving unit operable to drive the second main switch in accordance with the second driving signal; the third switch unit may include a third main switch and a third switch driving unit operable to drive the third main switch in accordance with the third driving signal; and the fourth switch unit may include a fourth main switch and a fourth switch driving unit operable to drive the fourth main switch in accordance with the fourth driving signal.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawings.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
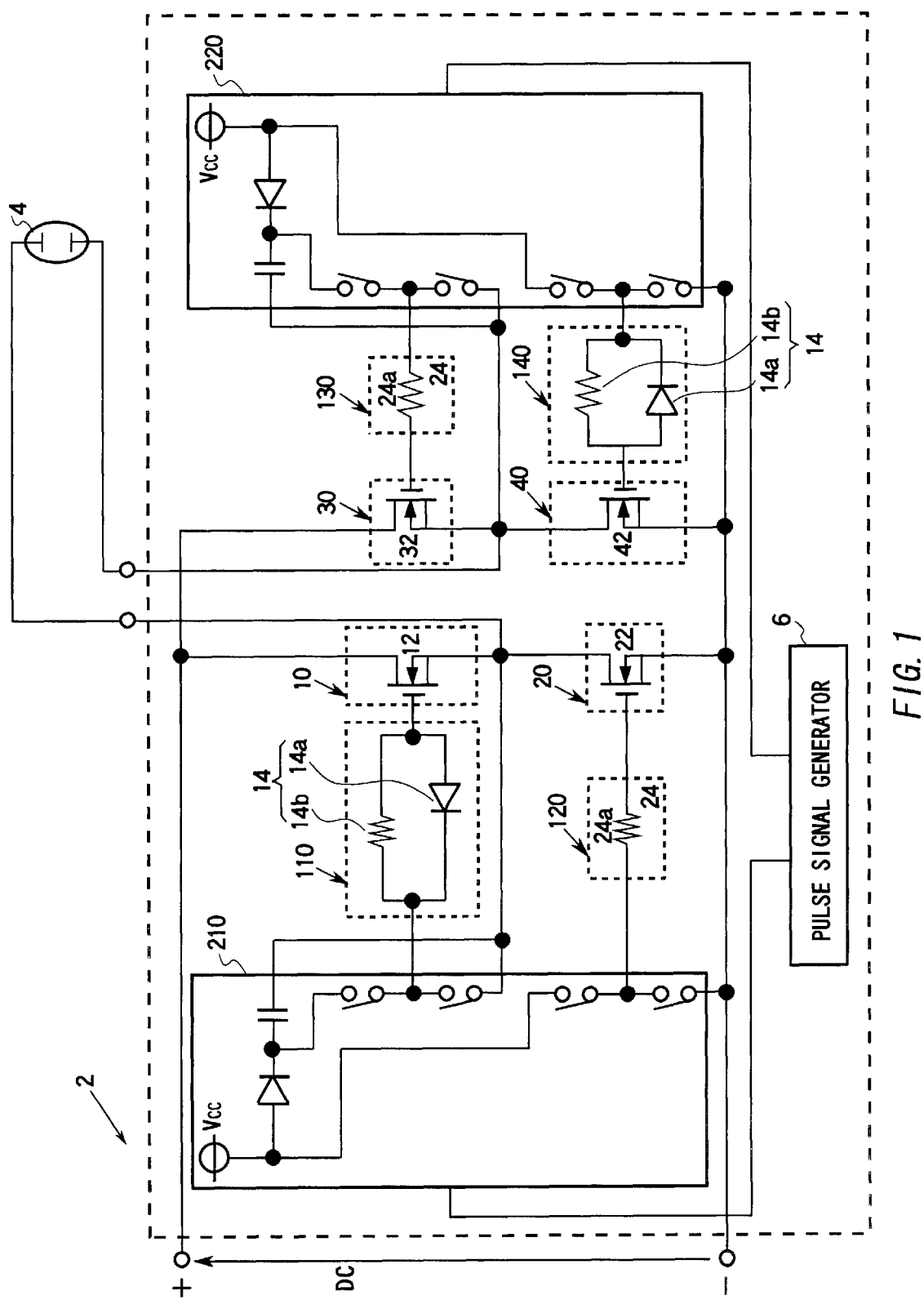
FIG. 1 is a circuit diagram of an inverter device according to the first embodiment of the present invention.

FIG. 1 is a circuit diagram showing an inverter device according to a first embodiment of the present invention. An inverter device 2 includes a full bridge arrangement as an example.

The inverter device 2 includes the first series circuit having a first switch unit 10 and a second switch unit 20 that are connected in series, and the second series circuit that is arranged in parallel to the first series circuit and has a third switch unit 30 and a fourth switch unit 40. An end of a load 4 is connected between the first and second switch units 10 and 20, while the other end of the load 4 is connected between the third and fourth switch units 30 and 40. The load 4 is, for example, a discharge lamp.

The inverter device 2 further includes: a pulse signal generator 6 operable to generate a pulse signal; the first switch driving unit 210 and the second switch driving unit 220 operable to be driven in accordance with the pulse signal; the first driving controller 110 operable to generate the first driving control signal in accordance with an output of the first switch driving unit 210 to drive the first switch unit 10 based on the first driving signal; and a second driving controller 120 operable to generate the second driving control signal in accordance with the output of the first switch driving unit 210 to drive the second switch unit 20 based on the second driving signal.

Moreover, the inverter device 2 includes: a third driving controller 130 operable to generate the third driving control signal in accordance with an output of the second switch driving unit 220 to drive the third switch unit 30 based on the third driving signal; and a fourth driving controller 140 operable to generate the fourth driving control signal in accordance with the output of the second switch driving unit 220 to drive the fourth switch unit 40 based on the fourth driving signal. The inverter device 2 drives a pair of the first and fourth switch units 10 and 40 and a pair of the second and third switch units 20 and 30 so as to be turned on and off alternately, thereby supplying an alternating voltage to the load 4.

Each of the first, second, third and fourth switch units 10, 20, 30 and 40 has an n-channel FET (Field Effect Transistor) as an example of a main switch. A drain of the FET 12 of the first switch unit 10 is connected to an anode of a DC power supply. A source of the FET 12 of the first switch unit 10 is connected to a drain of the FET 22 of the second switch unit 20. A source of the FET 22 of the second switch unit 20 is connected to a cathode of the DC power supply. Similarly, a drain of the FET 32 of the third switch unit 30 is connected to the anode of the DC power supply. A source of the FET 32 of the third switch unit 30 is connected to a drain of the FET 42 of the fourth switch unit 40. A source of the FET 42 of the fourth switch unit 40 is connected to the cathode of the DC power supply. Moreover, the drain of the FET 12 of the first switch unit 10 is connected to the drain of the FET 32 of the third switch unit 30, while the source of the FET 22 of the second switch unit 20 is connected to the source of the FET 42 of the fourth switch unit 40.

The first driving controller 110 has a resistor element 14 on a pulse-signal line. This resistor element 14 includes a diode 14a as an example of the first device group having a resistance value changing depending on a direction of a flow of an electric current. The diode 14a is connected in such a manner that a forward direction is a direction toward the first switch driving unit 210 seen from a gate of the FET 12, while the forward direction is assumed to be a direction of the electric current flow seen from a direction for turning off the first switch unit. The resistor element 14 also includes a resistor 14b having a fixed resistance value $R_{1ON}$ irrespective of the direction of the electric current flow, as an example of the second device group arranged electrically in parallel to the first device group. An equivalent resistance value $R_{1OFF}$ of the diode 14a for the electric current in the forward direction is extremely small and ideally approaches to 0 Ω, limitlessly, and therefore the resistance value $R_{1ON}$ of the resistor 14b can be sufficiently larger than $R_{1OFF}$.

In the first embodiment, the first main switch of the first switch unit 10 is the FET 12. The FET 12 has an input capacitance of $C_{10}$. Thus, the input capacitance of the FET 12 serves as a capacitor element of the first driving controller 110.

The second driving controller 120 has a resistor element 24 on the pulse-signal line. This resistor element 24 a resistor 24a having a resistance of $R_{12}$ as an example of the third device group having a fixed resistance value irrespective of the direction of the electric current flow. The resistance $R_{12}$ of the resistor 24a of the resistor element 24 and the resistance value $R_{1ON}$ of the resistor 14a and the equivalent resistance value $R_{1OFF}$ of the diode 14a of the first driving controller 110 has the following relationship.

$$R_{1ON} > R_{12} > R_{1OFF} \tag{1}$$

In the present embodiment, the FET 22 serving as the second main switch of the second switch unit 20 has an input capacitance that is the same as the input capacitance of $C_{10}$ of the FET 12 of the first switch unit 10. Thus, the input capacitance of the FET 22 serves as a capacitor element of the second driving controller 120.

Figure 2:
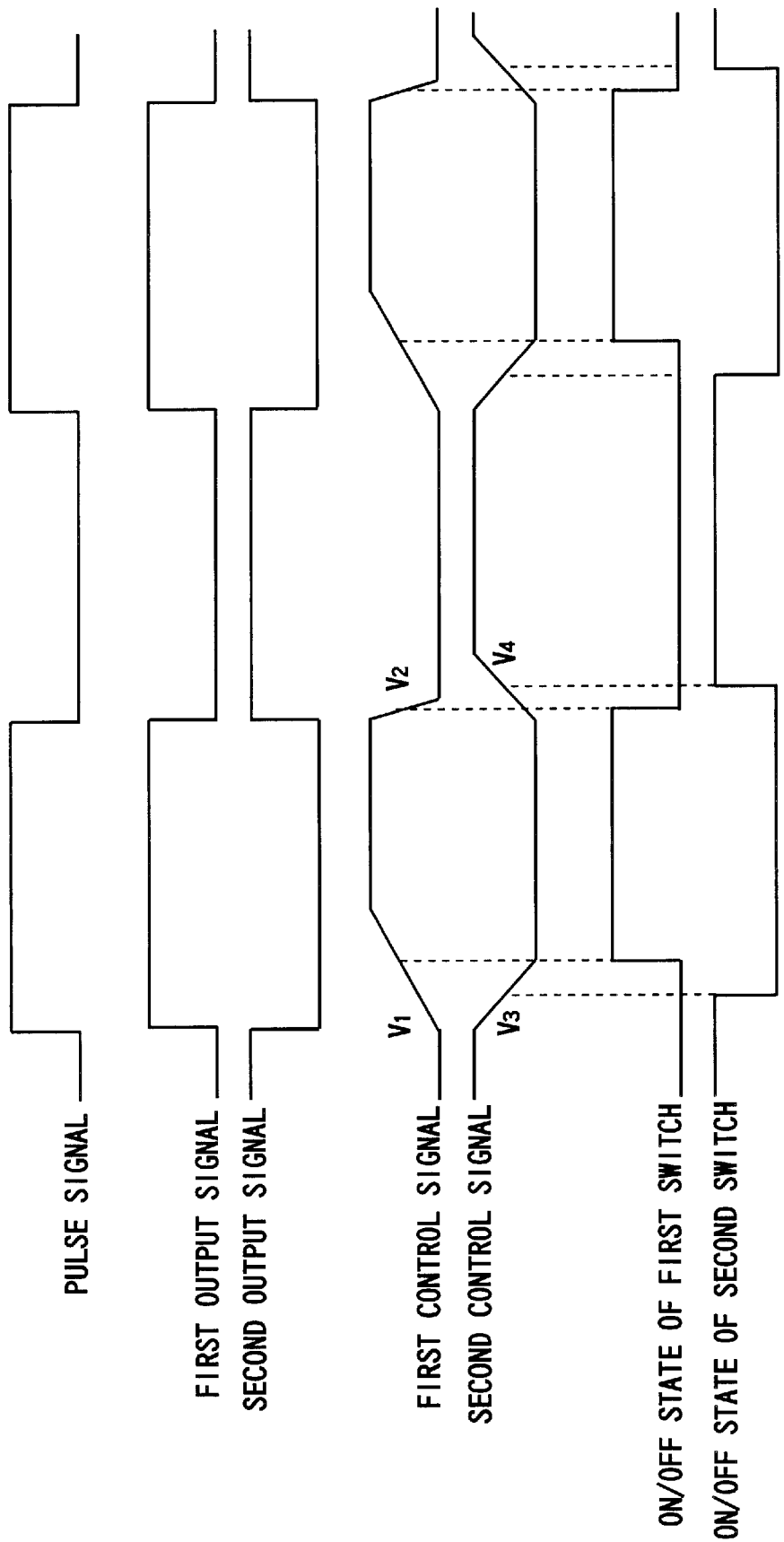
FIG. 2 is a timing chart of the inverter device shown in FIG. 1.

FIG. 2 is a timing chart of the inverter device shown in FIG. 1. The pulse signal generator 6 generates a square wave pulse signal as an example of the pulse signal. The pulse signal generator 6 inputs this pulse signal to the first switch driving unit 210.

An end of the first switch driving unit 210 is connected to the source of the FET 12 of the first switch unit 10, while the other end is connected to an input of the first driving controller 110. In accordance with the pulse signal from the pulse signal generator 6, the first switch driving unit 210 outputs the first output signal that applies a voltage between the gate of the FET 12 and the input end of the first driving controller 110 or places the gate of the FET 12 and the input end of the first driving controller 110 at the same potential.

A rising edge of the first output signal output from the first switch driving unit 210 corresponds to a direction in which the FET 12 of the first switch unit 10 is turned on. The electric current seen from the direction for turning on the FET 12 of the first switch unit 10 flows along a direction from the first switch driving unit 210 to the first switch unit 10. The direction of this electric current is opposite to the diode of the first driving controller 110. Thus, at the rising of the first output signal, the electric current flows through the resistor 14b of the resistor element 14. The equivalent resistance value of the resistor element 14 with respect to this electric current is the resistance value $R_{1ON}$ of the resistor 14b. The resistor 14b and the input capacitance of the FET 12 serve as an integrating circuit. Thus, at the rising of the first output signal, the first driving controller 110 makes the first driving signal rise with the first speed $V_1$. The first speed $V_1$ is in proportion to a reciprocal of the product (time constant) $R_{1ON}C_{10}$ of the resistance value $R_{1ON}$ and the input capacitance $C_{10}$ of the FET 12. This product $R_{1ON}C_{10}$ is an example of the first product in the inverter device of the present invention which includes the full-bridge arrangement.

When the first driving signal which rises with the first speed $V_1$ exceeds a threshold value, the first switch unit 10 is switched from an off state to an on state. An example of the threshold value for the switch between the on state and the off state is a mid-point between a high level and a low level of the driving signal. As shown in FIG. 2, a time at which the first switch unit 10 is switched to the on state is delayed depending on the rising speed $V_1$ of the first driving control signal. Please note that the on state and the off state of the switch unit are shown with high-level line and low-level line in FIG. 2.

On the other hand, a falling edge of the first output signal output from the first switch driving unit 210 corresponds to a direction for turning off the FET 12 of the first switch unit 10. The electric current along the direction for turning off the first switch unit flows in a direction from the first switch unit 10 to the first switch driving unit 210. This direction of the electric current is the forward direction of the diode 14a of the first driving controller 110. The resistance value $R_{1ON}$ of the resistor 14b is set to be larger than the resistance value $R_{1OFF}$ of the diode 14a in the forward direction. At the falling of the first output signal, most of this electric current can be considered as passing through the diode 14a. The equivalent resistance value of the resistor element 14 with respect to this electric current is approximately the resistance value $R_{1OFF}$ of the diode 14a in the forward direction. Thus, the first driving controller 110 makes the first driving signal fall with the second speed $V_2$ at the falling of the first output signal. This second speed $V_2$ is in proportion to a reciprocal of the product $R_{1OFF}C_{10}$ of the resistance value $R_{1OFF}$ of the diode 14a in the forward direction and the input capacitance $C_{10}$ of the FET 12. This product $R_{1OFF}C_{10}$ is an example of the fifth product of the inverter device of the present invention having the full-bridge arrangement. In accordance with the speed $V_2$, a time at which the first switch unit 10 is switched to the off state is delayed.

Another end of the first switch driving unit 210 is connected to the source of the FET 22 of the second switch unit 20, while another end of the first switch driving unit 210 is connected to an input of the second driving controller 120. In accordance with the pulse signal from the pulse signal generator 6, the first switch driving unit 210 outputs the second output signal that applies a voltage between the gate of the FET 22 and the input end of the second driving controller 120 or places the gate of the FET 22 and the input end of the second driving controller 120 at the same potential. The second output signal has an opposite relationship with the first output signal.

Moreover, a falling edge of the second output signal output from the first switch driving unit 210 corresponds to a direction for turning off the second switch unit 20. The electric current seen from the direction for turning off the second switch unit 20 flows along a direction from the second switch unit 20 to the first switch driving unit 210. This electric current flows through the resistor 24a. Thus, at the falling of the second output signal, the electric current makes the second driving signal rise with the third speed $V_3$, as shown in FIG. 2. The third speed $V_3$ is in proportion to a reciprocal of the product $R_{12}C_{10}$ of the resistance value $R_{12}$ of the resistor 24a and the input capacitance $C_{10}$ of the FET 22. This product $R_{12}C_{10}$ is an example of the second product in the inverter device of the present invention which includes the full-bridge arrangement. In accordance with the speed $V_3$, a time at which the second switch unit 20 is turned off is delayed.

On the other hand, a rising edge of the second output signal output from the first switch driving unit 210 corresponds to a direction for turning on the second switch unit 20. The electric current along the direction for turning on the second switch unit 20 flows along a direction from the second switch driving unit 220 to the second switch unit 20. This electric current also flows through the resistor 24a. Thus, at the falling of the second output signal, the second driving controller 120 makes the second driving signal rise with the fourth speed $V_4$. The fourth speed $V_4$ is the same as the third speed $V_3$ and therefore is the reciprocal of $R_{12}C_{10}$. This product $R_{12}C_{10}$ is an example of the sixth product in the inverter device having the full-bridge the present invention. In accordance with the falling speed $V_4$, a time at which the second switch unit is turned on is delayed.

Since the resistor element 24 of the second driving controller 120 and the resistor element 14 of the first driving controller has the relationship expressed by Equation (1), the following relationship is satisfied.

$$R_{1ON}C_{10} > R_{12}C_{10} > R_{1OFF}C_{10} \qquad (2)$$

Thus, the third and fourth speeds $V_3$ and $V_4$ of the second driving signal are higher than the first speed $V_1$ of the first driving signal but lower than the second speed $V_2$ of the first driving signal. Since the first speed $V_1$ is lower than the third speed $V_3$, the switching of the first switch unit 10 to the on state is delayed as compared to the switching of the second switch unit 20 to the off state. Thus, a period in which both the first and second switch units are on occurs. On the other hand, since the fourth speed $V_4$ is lower than the second speed $V_2$, the switching of the second switch unit 20 to the on state is further delayed as compared with the switching of the first switch unit 10 to the off state. Thus, a period in which the both the first and second switch units 10 and 20 are off occurs. The inverter device 2 according to the first embodiment can prevent a situation where both the first and second switch units 10 and 20 are on, even if any of the first and second switch units 10 and 20 is driven to be turned on and off.

The second switch driving unit 220 has a similar arrangement to that of the first switch driving unit 210. In order to alternately drive pair of the first switch unit 10 and the fourth switch unit 40 and another pair of the second switch unit 20 and the third switch unit 30 to be turned on and off, the second switch driving unit 220 outputs the third signal, that is the same as the second output signal, to the third driving controller 130, and outputs the fourth signal, that is the same as the first output signal, to the fourth driving controller 140.

The third driving controller 130 has the resistor element 24 on the pulse signal line. The resistor element 24 has the resistor 24a having the resistance value R12 as an example of the fourth device group having a fixed resistance value irrespective of the direction of the electric current flow. The third driving controller 130 has a similar arrangement to that of the second driving controller 120. Thus, the third driving controller 130 makes the third driving signal fall with the aforementioned speed $V_3$ at the rising of the pulse signal that turns the first switch unit 10 on. Moreover, the third driving controller 130 arises the third driving signal with the aforementioned speed $V_4$ at the falling of the pulse signal that turns off the first switch unit 10. The third and fourth speeds V3 and V4 are in proportion to the reciprocal of the product of the resistance value $R_{12}$ of the resistor element 24 and the input capacitance $C_{10}$ of the third switch unit. This product is an exemplary fourth product and an exemplary eighth product in the inverter device of the present invention.

The fourth driving controller 140 has the resistor element 14 on the pulse signal line. The resistor element 14 has the diode 14a as an example of the fifth device group having the resistance value changing depending on the direction of the electric current flow. The diode 14a is connected in such a manner that a direction toward the second switch driving unit 220 seen from a gate of the FET 42 is the forward direction, while the forward direction is considered to as the direction of the electric current flow seen from a direction for turning off the fourth switch unit. The resistor element 14 further includes the resistor 14b having a fixed resistance value $R_{1ON}$ irrespective of the direction of the electric current flow as an example of the sixth device group arranged electrically in parallel to the fifth device group. The resistance value $R_{1ON}$ of the resistor 14b is set larger than the resistance value $R_{1OFF}$ of the diode 14a for the electric current flow along the forward direction. The fourth driving controller 140 has a similar arrangement to that of the first driving controller 110.

Therefore, the fourth driving controller 140 makes the fourth signal rise with the aforementioned speed $V_1$ at the rising of the pulse signal for turning the fourth switch unit 40 on. The first speed V1 is in proportion to the reciprocal of the product of the resistance value $R_{1ON}$ of the resistor 14b and the input capacitance $C_{10}$ of the fourth switch unit, mentioned above. This product is an example of the third product in the inverter device of the present invention that has the full-bridge arrangement. Moreover, the fourth driving controller 140 makes the fourth signal fall with the aforementioned second speed $V_2$ at the falling of the pulse signal for turning the fourth switch unit 40 off. The second speed $V_2$ is in proportion to the reciprocal of the product of the resistance value $R_{1OFF}$ of the diode 14a in the forward direction and the input capacitance $C_{10}$ of the fourth switch unit, mentioned above. This product is an example of the seventh product in the inverter device of the present invention that has the full-bridge arrangement.

The first, second, third and fourth speeds in the first, second, third and fourth speeds have the relationship expressed by Equation (2). Thus, when switching the first and fourth switch units 10 and 40 from the on state to the off state, the first, second, third and fourth driving controllers 110, 120, 130 and 140 switch the second and third switch units 20 and 30 from the off state to the on state in such a manner that the switching of the second and third switch units 20 and 30 is delayed from the switching of the first and fourth units 10 and 40. Moreover, when switching the second and third switch units 20 and 30 from the on state to the off state, the first, second, third and fourth driving controllers 110, 120, 130 and 140 switch the first and fourth switch units 10 and 40 in such a manner that the switching of the first and fourth switch units 10 and 40 is delayed from the switching of the second and third switching units 20 and 30. Therefore, when any manner of switching is performed, it is possible to prevent a situation where two or more switch units are simultaneously on from occurring.

Figure 3:
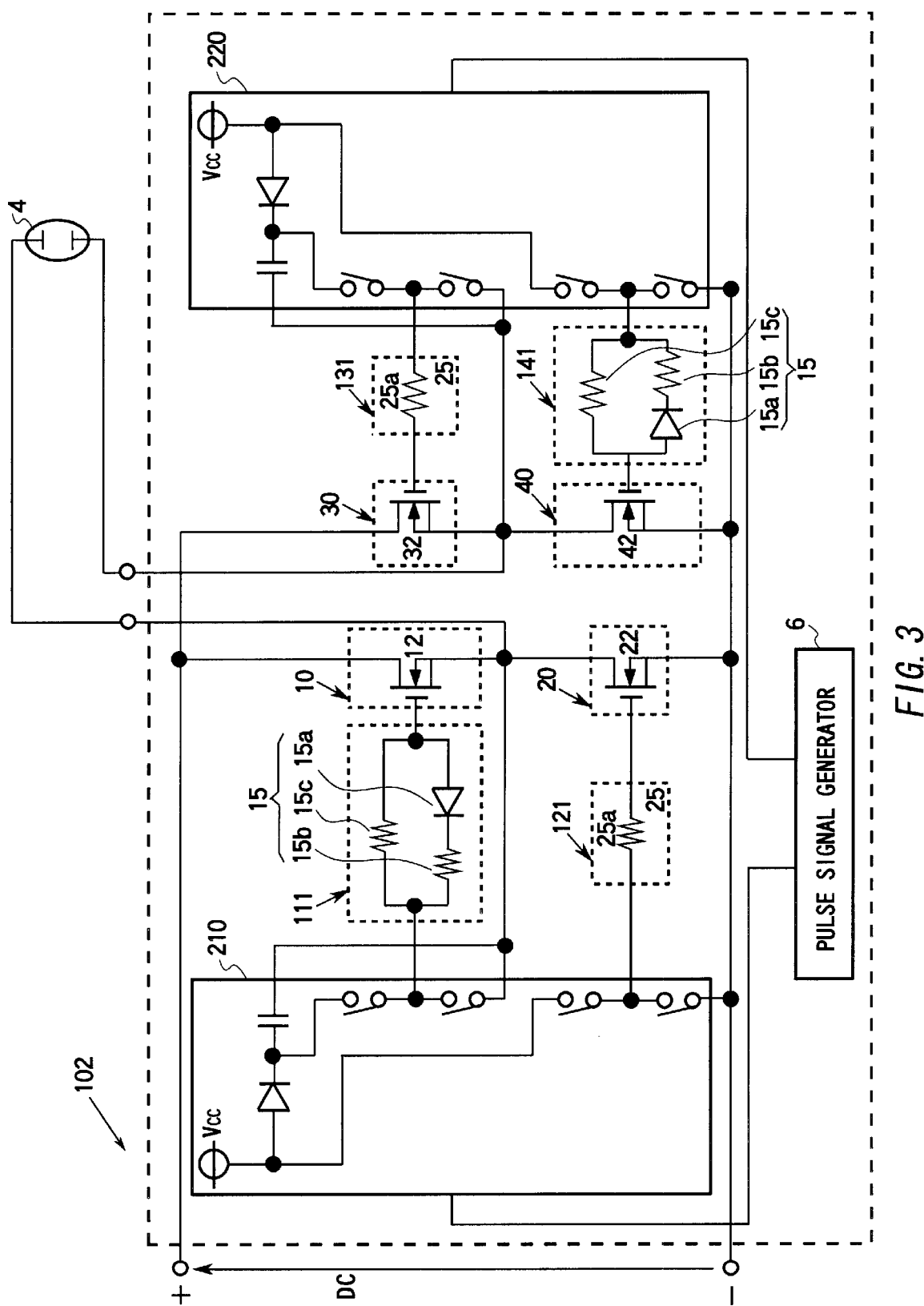
FIG. 3 is a circuit diagram of an inverter device according to the second embodiment of the present invention.

FIG. 3 is a circuit diagram of an inverter device 102 according to the second embodiment of the present invention. The inverter device 102 is different from that of the first embodiment in the first, second, third and fourth driving controllers 111, 121, 131 and 141. The arrangement and the components of the inverter device 102 that are the same as those in the first embodiment have the same reference numerals as those in FIG. 1 and the description thereof is omitted. This is the same as in the following embodiments.

The first driving controller 111 has a resistor element 15 on the pulse signal line. The resistor element 15 includes a diode 15a and a resistor 15b arranged in parallel to the diode 15a that are an exemplary first device group. The diode 15a is connected in such a manner that the forward direction is the direction of the electric current flow seen from the direction for turning off the first switch unit 10. For the diode 15a, the forward direction is a direction toward the first switch driving unit 210 seen from the gate of the FET 12. The resistor 15b arranged in series to the diode 15a is set to have a resistance value $R_{2OFF}$ larger than the resistance value of the diode 15a in the forward direction. The resistor element 15 further includes a resistor 15c having a resistance value $R_{2ON}$ as an exemplary second device group arranged electrically in parallel to the first device group.

On the other hand, the second driving controller 121 has a resistor element 25 on the pulse signal line. The resistor element 25 includes a resistor 25a having a resistance value $R_{22}$ as an exemplary third device group. The resistance value $R_{22}$ of the resistor value 25, the equivalent resistance values $R_{2ON}$ and $R_{2OFF}$ of the first driving controller 111 are set to satisfy the following relationship.

$$R_{2ON} > R_{22} > R_{2T} \qquad (3)$$

where the resistance value $R_{2T}$ is $(1/R_{2ON}+1/R_{2OFF})^{-1}$.

At the rising of the pulse signal in the direction for turning on the first switch unit 10, the first driving controller 111 arises the first driving signal with the first speed. The first speed is in proportion to the reciprocal of the product $R_{2ON}C_{10}$ of the resistance value $R_{2ON}$ of the resistor 15c of the resistor element 15 and the input capacitance $C_{10}$ of the FET 12.

On the other hand, the electric current in the direction for turning off the first switch unit 10 flows in the direction from the first switch unit 10 to the first switch driving unit 210. The equivalent resistance value $R_{2T}$ of the resistor element 15 for this electric current is $(1/R_{2ON}+1/R_{2OFF})^{-1}$. Since the resistance value of the diode 15a in the forward direction is set smaller than the resistance values $R_{2ON}$ and $R_{2OFF}$ of the resistors 15b and 15c of the resistor element 15, it can be ignored here. Thus, at the falling of the pulse signal in the direction for turning off the first switch unit 10, the first driving controller 111 makes the first driving signal fall with the second speed. The second speed is the reciprocal of the product $R_{2T}C_{10}$ of the equivalent resistance value $R_{2T}$ of the resistor element 15 and the input capacitance $C_{10}$ of the FET 12.

The second driving unit 121 makes the second driving signal fall with the third speed at the rising of the pulse signal in the direction for turning on the first switch unit 10, like the first embodiment. This third speed is in proportion to the reciprocal of the product $R_{22}C_{10}$ of the resistance value $R_{22}$ of the resistor 25a and the input capacitance $C_{10}$ of the FET 22. Moreover, at the falling of the pulse signal in the direction for turning off the first switch unit 10, the second driving controller 121 makes the second driving signal rise with the fourth speed. This fourth speed is the same as the aforementioned third speed.

Since the resistor element 25 of the second driving controller 121 and the resistor element 15 of the first driving controller have the above relationship of Equation (3), the following relationship is satisfied.

$$R_{2ON}C_{10} > R_{22}C_{10} > R_{2T}C_{10} \qquad (4)$$

That is, the third and fourth speeds of the second driving signal are higher than the first speed of the first driving signal but lower than the second speed of the first driving signal.

The third driving controller 131 has a similar arrangement to that of the second driving controller 121. Thus, the third driving controller 131 generates the third driving control signal that is similar to the second driving control signal of the second driving controller 121. Also, the fourth driving controller 141 has a similar arrangement to that of the first driving controller 111. Thus, the fourth driving controller 141 generates the fourth driving control signal that is similar to the first driving control signal of the first driving controller 111.

The relationship of the magnitude of the first, second, third and fourth speeds in the first, second, third and fourth driving signals of the inverter device 102 is the same as that in the first embodiment. Therefore, when any manner of switching is performed, it is possible to prevent the situation where two or more switch units are simultaneously on from occurring.

Figure 4:
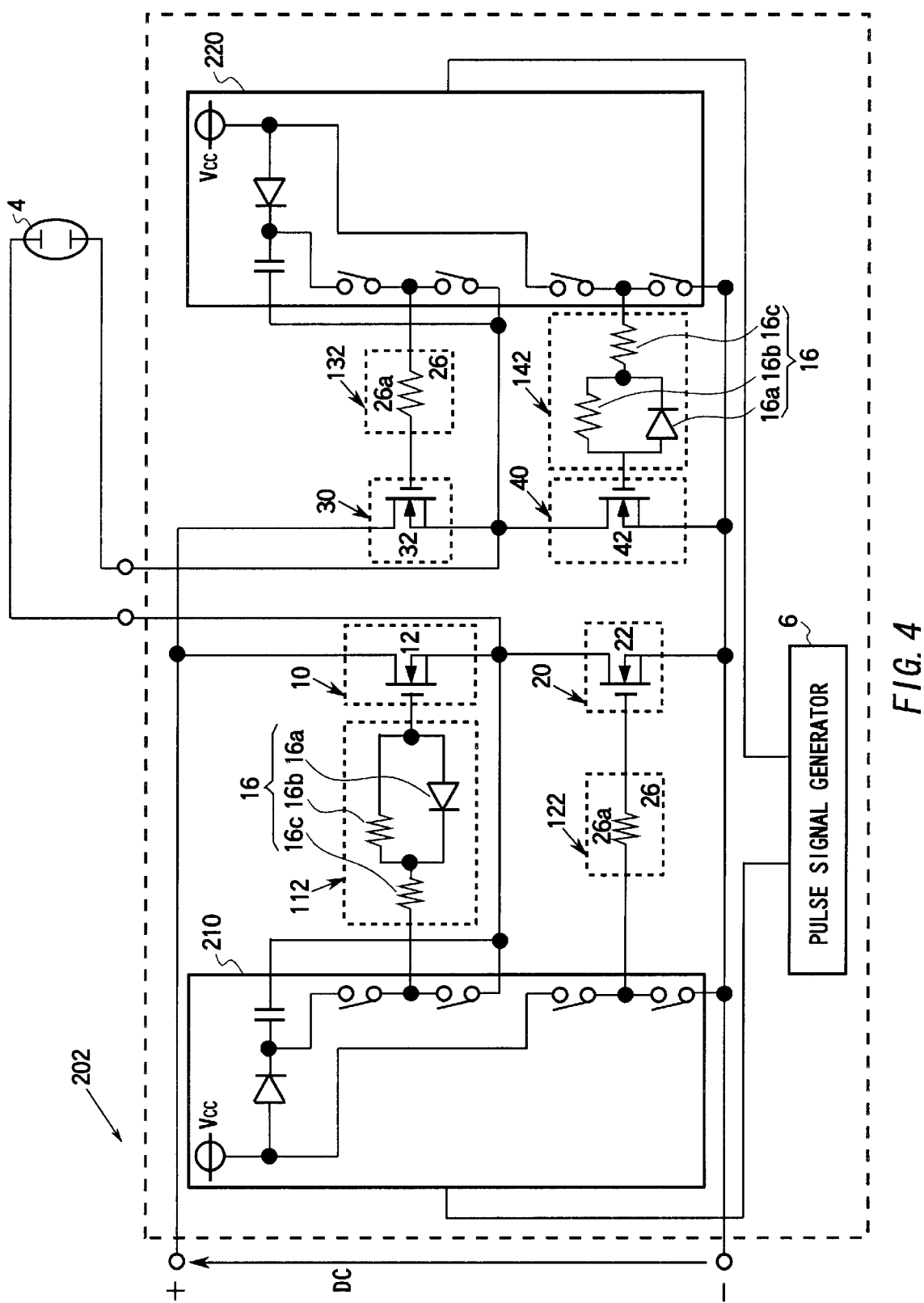
FIG. 4 is a circuit diagram of an inverter device according to the third embodiment of the present invention.

FIG. 4 is a circuit diagram of an inverter device 202 according to the third embodiment of the present invention. The inverter device 202 is different from that of the first embodiment in the first, second, third and fourth driving controllers 112, 122, 132 and 142.

The first driving controller 112 has a resistor element 16 on the pulse signal line. The resistor element 16 includes a diode 16a, the first resistor 16b arranged electrically in parallel to the diode 16a and the second resistor 16c arranged in series to the diode 16a and the first resistor 16b that are arranged in parallel. The diode 16a is connected in such a manner that the forward direction is the direction of the electric current flow seen from the direction for turning off the first switch unit 10. For the diode, the forward direction is a direction toward the first switch driving unit 210 seen from the gate of the FET 12. Moreover, the first resistor 16b has a fixed resistance value $R_{3ON}$ irrespective of the direction of the electric current flow. Also, the second resistor 16c has a fixed resistance value $R_{3OFF}$ irrespective of the direction of the electric current flow. Both the resistor values $R_{3ON}$ and $R_{3OFF}$ are set larger than the resistance value of the diode 16a in the forward direction.

The electric current seen from the direction for turning on the first switch unit 10 flows in the backward direction of the diode 16a of the first driving controller 112. The equivalent resistance value $R_{3T}$ of the resistor element 16 for this electric current is ($R_{3ON}$+$R_{3OFF}$). Thus, at the rising of the pulse signal in the direction for turning on the first switch unit 10, the first driving controller 112 makes the first driving signal rise with the first speed. This first speed is in proportion to a reciprocal of the product $R_{3T}C_{10}$ of the equivalent resistance value $R_{3T}$ of the first and second resistors 16b and 16c of the resistor element 16 connected in series and the input capacitance $C_{10}$ of the FET 12.

On the other hand, the electric current seen from the direction for turning off the first switch unit 10 flows in the direction from the first switch unit 10 to the first switch driving unit 210. This direction of the electric current flow is the forward direction of the diode 16a of the first driving controller 112. Since the resistance value of the diode 16a in the forward direction is set smaller than the resistance value $R_{3ON}$ of the first resistor 16b of the resistor element 16, it can be considered that almost no electric current flows through the first resistor 16b. Therefore, the equivalent resistance value of the resistor element 16 for this electric current is $R_{3OFF}$. Thus, at the falling of the pulse signal in the direction for turning off the first switch unit 10, the first driving controller 112 makes the first driving signal fall with the second speed. This second speed is in proportion to a reciprocal of the product $R_{3OFF}C_{10}$ of the equivalent resistance value $R_{3OFF}$ of the resistor element 16 and the input capacitance $C_{10}$ of the FET 12.

The second driving controller 122 has a resistor element 26 on the pulse signal line. The resistor element 26 includes a resistor 26a having a resistance value $R_{32}$ as an exemplary third device group. The resistance value $R_{32}$ of the resistor value 26 and the resistance values $R_{3ON}$ and $R_{3OFF}$ of the resistors 16b and 16c of first driving controller 112 are set to satisfy the following relationship.

$$R_{3T} > R_{32} > R_{3OFF} \quad (5)$$

where the resistance value $R_{3T}$ is ($R_{3ON}$+$R_{3OFF}$)

At the rising of the pulse signal in the direction for turning on the first switch unit 10, the second driving controller 122 arises the second driving signal with the third speed, as in the first embodiment. The third speed is in proportion to a reciprocal of the product $R_{32}C_{10}$ of the resistance value $R_{32}$ of the resistor 26a and the input capacitance $C_{10}$ of the FET 12. Moreover, at the falling of the pulse signal in the direction for turning off the first switch unit 10, the second driving controller 122 makes the second driving signal rise with the fourth speed. This fourth speed is the same as the aforementioned third speed.

Since the resistor element 26 of the second driving controller 122 and the resistor element 16 of the first driving controller has the above relationship of Equation (5), the following relationship is satisfied.

$$R_{3T}C_{10} > R_{32}C_{10} > R_{3OFF}C_{10} \quad (6)$$

Thus, the third and fourth speeds of the second driving signal are higher than the first speed of the first driving signal but lower than the second speed of the first driving signal.

The third driving controller 132 has a similar arrangement to that of the second driving controller 122. Also, the fourth driving controller 142 has a similar arrangement to that of the first driving controller 112.

The relationship of the magnitude of the first, second, third and fourth speeds in the first, second, third and fourth driving signals in the inverter device 202 is the same as that in the first embodiment. Therefore, when any manner of switching is performed, it is possible to prevent the situation where two or more switch units are on simultaneously.

Figure 5:
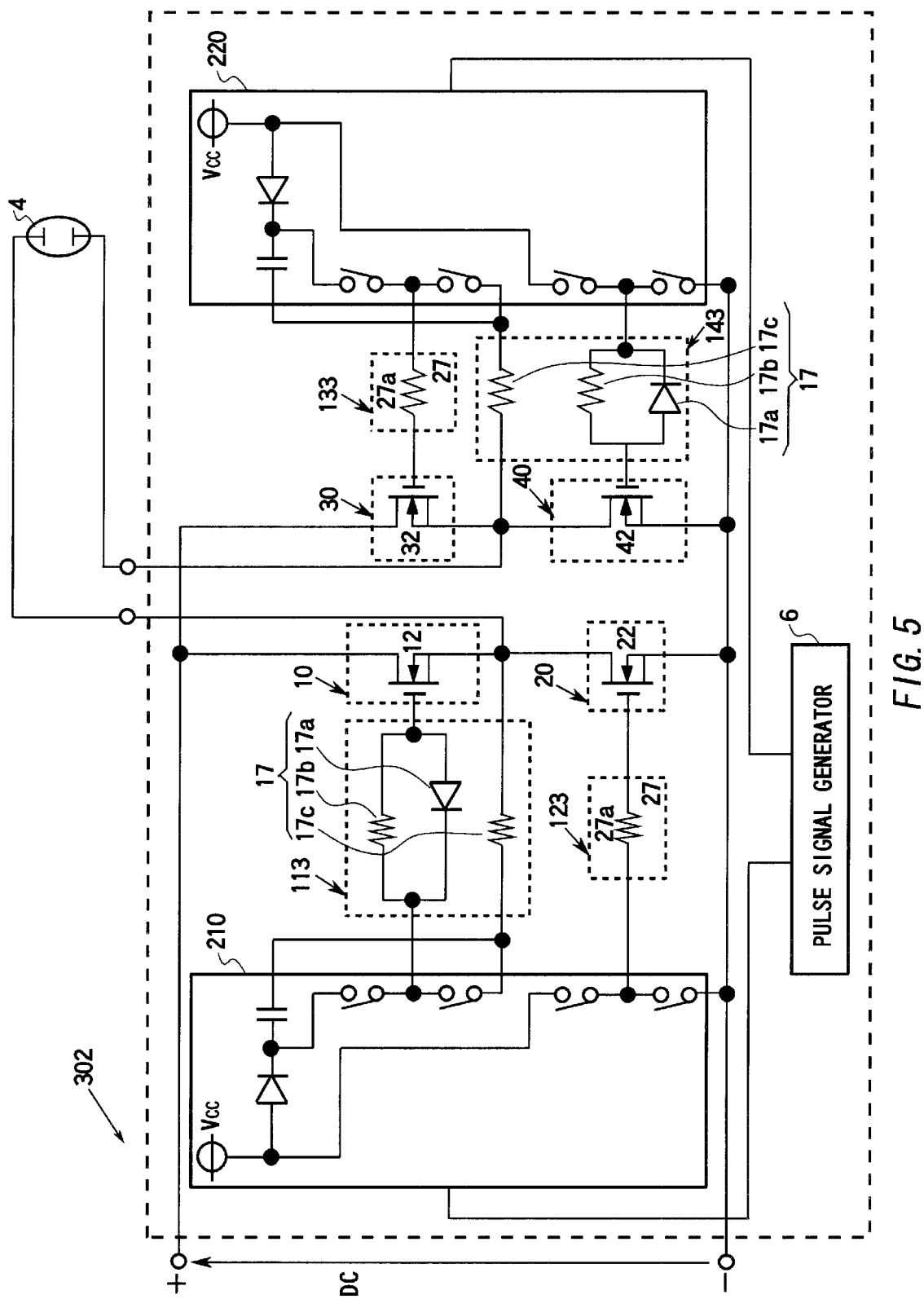
FIG. 5 is a circuit diagram of an inverter device according to the fourth embodiment of the present invention.

FIG. 5 is a circuit diagram of an inverter device 302 according to the fourth embodiment of the present invention. The inverter device 302 is different from the inverter device 202 of the third embodiment in the position of the second resistor of the resistor element of the first and third driving controllers 113 and 133.

The first driving controller 113 in the fourth embodiment has a resistor element 17 on the pulse signal line. The resistor element 17 includes a diode 17a and the first resistor 17b arranged electrically in parallel to the diode 17a. The diode 17a is connected in such a manner that the forward direction is the direction of the electric current flow seen from the direction for turning off the first switch unit 10. The first resistor 17b has a resistance value $R_{4ON}$.

The resistor element of the first driving controller 113 further includes the second resistor 17c which is connected to the source of the FET 12 of the first switch unit 10 at one end and is connected to the first switch driving unit 210 at the other end. The second resistor has a resistance value $R_{4OFF}$. Both the resistor values $R_{4ON}$ and $R_{4OFF}$ are set larger than the resistance value of the diode 17a in the forward direction.

On the other hand, the second driving controller 123 has a resistor element 27 on the pulse signal line, like the second driving controller 122 in the third embodiment. The resistor element 27 includes a resistor 27a having a resistance value $R_{42}$. The resistance value $R_{42}$ of the resistor 27a and the resistance values $R_{4ON}$ and $R_{4OFF}$ of the resistors 17b and 17c of first driving controller 113 are set to satisfy the following relationship.

$$R_{4T} > R_{42} > R_{4OFF} \quad (7)$$

where the resistance value $R_{4T}$ is ($R_{4ON}$+$R_{4OFF}$).

The electric current seen from the direction for turning on the first switch unit 10 flows in a direction from the first switch driving unit 210 to the second resistor 17c via the input capacitance of the FET 12 of the first switch unit 10.

This direction of the electric current flow is the backward direction of the diode of the first driving controller 113. Thus, the equivalent resistance value $R_{4T}$ of the resistor element 17 for this electric current is ($R_{4ON}+R_{4OFF}$), mentioned above.

On the other hand, the electric current seen from the direction for turning off the first switch unit 10 flows in a direction toward the first switch driving unit 210 via the input capacitance of the FET 12 of the first switch unit 10. That is, the electric current flows in the forward direction of the diode of the first driving controller 113. This electric current flows through both the first resistor 17b and the diode 17a of the resistor element 17 and also flows through the second resistor 17c. However, since the resistance value of the diode 17a in the forward direction is set smaller than the resistance value $R_{4ON}$ of the first resistor 17b, it can be considered that almost no electric current flows through the first resistor 17b. Therefore, the equivalent resistance value for this electric current is $R_{4OFF}$.

Since the resistor element 27 of the second driving controller 123 and the resistor element 17 of the first driving controller 113 has the above relationship of Equation (7), the following relationship is satisfied.

$$R_{4T}C_{10} > R_{42}C_{10} > R_{4OFF}C_{10} \tag{8}$$

Equation (8) corresponds to Equation (6) in the third embodiment. Thus, in the fourth embodiment, the third and fourth speeds of the second driving signal are higher than the first speed of the first driving signal but are lower than the second speed of the first driving signal, like the third embodiment.

The third driving controller 133 has a similar arrangement to that of the second driving controller 123. Also, the fourth driving controller 143 has a similar arrangement to that of the first driving controller 113.

The relationship of the magnitude of the first, second, third and fourth speeds in the first, second, third and fourth driving signals in the inverter device 302 is the same as that in the third embodiment. Therefore, when any manner of switching is performed, it is possible to prevent the situation where two or more switch units are on simultaneously.

Figure 6:
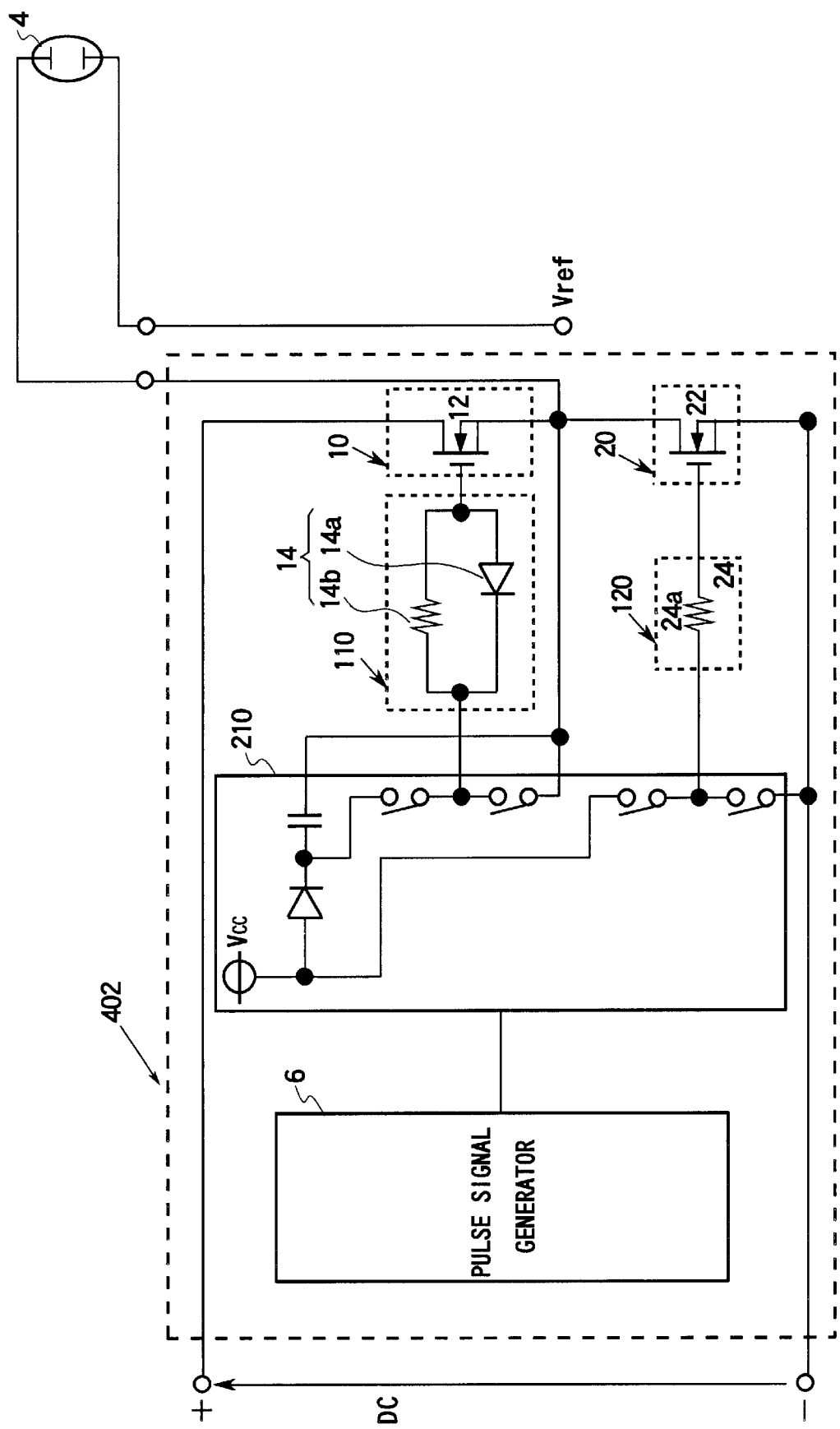
FIG. 6 is a circuit diagram of an inverter device according to the fifth embodiment of the present invention.

FIG. 6 is a circuit diagram of an inverter device 402 according to the fifth embodiment of the present invention. Although the inverter devices of the first, second, third and fourth embodiments have the full-bridge arrangement having four switch units, the inverter device 402 of the fifth embodiment has a half-bridge arrangement.

The inverter device 402 of the fifth embodiment includes a pulse signal generator 6, the first switch driving unit 210, the first and second driving controllers 110 and 120, and the first and second switch units 10 and 20. The first and second switch units 10 and 20 are connected in series. A one end of this series circuit 50 is connected to an anode of a DC power supply, while the other end is connected to a cathode of the DC power supply. A one end of a load 4 is connected between the first and second switch units 10 and 20. The other end of the load 4 is connected to a reference voltage $V_{ref}$. This reference voltage $V_{ref}$ is set to a mid-point voltage of a DC voltage applied to the series circuit in a case where the anode of the DC power supply has a positive potential equal to or higher than a ground potential of 0V and the cathode of the DC power supply has the ground potential of 0V. Moreover, in a case of a discharge lamp lighting circuit described Japanese Patent Application Laid-Open No. 2001-6891, the DC voltage is applied to the series circuit in such a manner that the anode of the DC power supply has the positive potential equal to or higher than the ground potential of 0V while the cathode of the DC power supply has a negative potential equal to or lower than the ground potential of 0V. In this case, the reference voltage $V_{ref}$ is connected, for example, to the ground potential of 0V.

In the fifth embodiment, the first driving controller 110 connected to the first switch unit 10 has the same arrangement as that of the first driving controller 110 in the first embodiment. Similarly, the second driving controller 120 connected to the second switch unit 20 has the same arrangement as that of the second driving controller 120 in the first embodiment. Therefore, the first driving controller 110 generates the first driving control signal for driving the first switch unit 10 shown in FIG. 2 in the first embodiment. The first speed $V_1$ with which the first driving signal rises is in proportion to the reciprocal of the product of the resistance value of the resistor 14b and the input capacitance of the first switch unit 10. This product is one example of the first product in the inverter device according to the present invention. The second speed $V_2$ with which the second driving signal falls is in proportion to the reciprocal of the product of the resistance value of the diode 14a in the forward direction and the input capacitance of the first switch unit 10. This product is one example of the third product in the inverter device according to the present invention.

Similarly, the second driving controller 120 generates the second driving control signal for driving the second switch unit 20 shown in FIG. 2 in the first embodiment. The third speed $V_3$ and the fourth speed $V_4$ of the second driving signal are in proportion to the reciprocal of the product of the resistance value of the resistor element 24 and the input capacitance of the second switch unit 20. This product is one example of the second product and the fourth product in the inverter device according to the present invention.

Also in the fifth embodiment, the relationship of the magnitude of the first, second, third and fourth speeds in the first, second, third and fourth driving signals is the same as that in the first embodiment. Therefore, when any manner of switching is performed, it is possible to prevent the situation where two or more switch units are on simultaneously.

Figure 7:
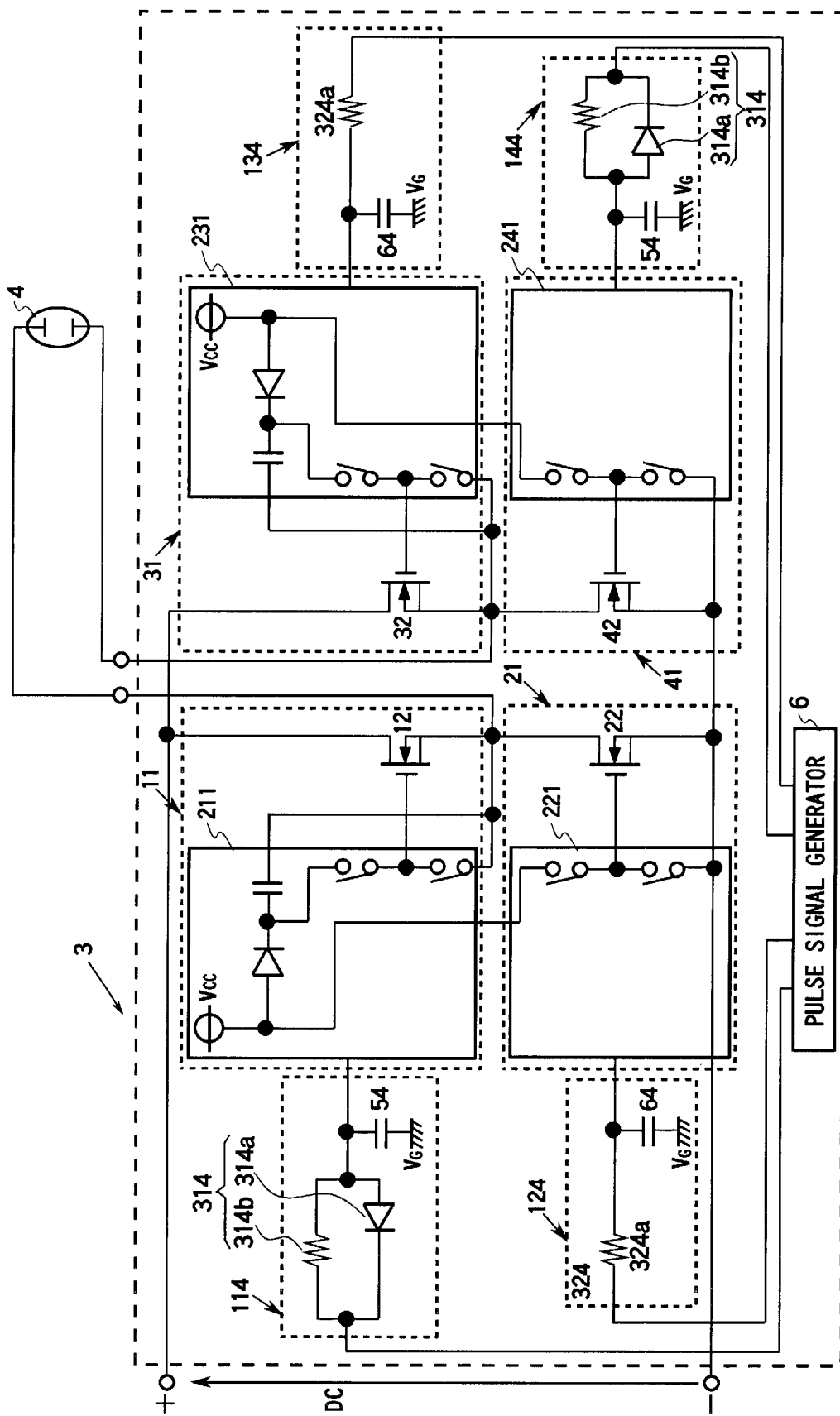
FIG. 7 is a circuit diagram of an inverter device according to the sixth embodiment of the present invention.

FIG. 7 is a circuit diagram of an inverter device 3 according to the sixth embodiment of the present invention. All the inverter devices of the first to fifth embodiments have the driving controllers provided between the associated switch unit and switch driving controller. In the inverter device 3 of the sixth embodiment, the switch unit includes a main switch and a switch driving unit, and the driving controller is provided between the pulse signal generator and the switch driving controller of the switch unit.

Each of the first, second, third and fourth switch units 11, 21, 31 and 41 has the main switch and the switch driving unit. The first, second, third and fourth main switch 12, 22, 32 and 42 of the first, second, third and fourth switch units 11, 21, 31 and 41 are connected to the load 4 in the similar manner to that in the first embodiment.

The first switch driving unit 211 of the first switch unit 11 is connected to an input portion of the first main switch 12. The first driving controller 114 is provided on the input side of the first switch driving unit 211. The first driving controller 114 generates the first driving signal for driving the first switch unit 11 to be turned on and off. The first driving controller 114 inputs the first driving signal to the first switch driving unit 211.

Similarly, the second switch driving unit 221 of the second switch unit 21 is connected to an input portion of the second main switch 22. The second driving controller 124 is provided on the input side of the second switch driving unit 221. The second driving controller 124 generates the second driving signal for driving the second switch unit 21 to be turned on and off. The second driving controller 124 inputs the second driving signal to the second switch driving unit 221.

The first driving controller 114 has a resistor element 314 on the pulse signal line. The resistor element 314 has a diode 314a as an exemplary first device group. The diode 314a is connected in such a manner that the forward direction thereof is the direction of the electric current flow seen from the direction for turning off the first switch unit 10. As shown in FIG. 7, the direction toward the pulse signal generator 6 seen from the first switch driving unit 211 is set to be the forward direction of the diode 314a. Moreover, the resistor element 314 includes a resistor 314b having a resistance value $R_{6ON}$ as an exemplary second device group arranged electrically in parallel to the first device group.

The first driving controller 114 further includes a capacitor element 54. The capacitor element 54 has a capacitance $C_{61}$. One end of the capacitor element 54 is connected between the resistor element 314 and the first switch driving unit 211. The other end of the capacitor element 54 is connected to a reference voltage $V_g$, which has, for example, a ground potential.

The second driving controller 124 has a resistor element 324 on the pulse signal line. The resistor element 324 has a resistor 324b having a resistance value $R_{62}$ as an exemplary third device group. The resistor element 324 further includes a capacitor element 64. The capacitor element 64 has a capacitance $C_{62}$. One end of the capacitor element 64 is connected between the resistor element 324 and the second switch driving unit 221. The other end of the capacitor element 64 is connected to the reference voltage $V_g$. The reference voltage is, for example, a ground potential.

The resistance values $R_{6ON}$ and $R_{6OFF}$ of the resistor element 314 of the first driving controller 114, the capacitance $C_{61}$ of the capacitor element 54, the resistance value $R_{62}$ of the resistor element 32 of the second driving controller 124, and the capacitance $C_{62}$ of the capacitor element 64 are set to satisfy the following relationship.

$$R_{6ON}C_{61} > R_{62}C_{62} > R_{6OFF}C_{61} \quad (9)$$

The sixth embodiment corresponds to a modification of the first embodiment obtained by replacing the input capacitance of the FET in the first embodiment with separate capacitor elements in the driving controllers. Please note that Equation (9) in the sixth embodiment corresponds to Equation (2) in the first embodiment. Thus, the third and fourth speeds of the second driving signal are higher than the first speed of the first driving signal but are lower than the second speed of the first driving signal.

The third driving controller 134 has a similar arrangement to that of the second driving controller 124. Thus, the third driving controller 134 generates the third driving control signal that is similar to the second driving control signal of the second driving controller 124. Also, the fourth driving controller 144 has a similar arrangement to that of the first driving controller 114. Thus, the fourth driving controller 144 generates the fourth driving control signal that is similar to the first driving control signal of the first driving controller 114.

The relationship of the magnitude of the first, second, third and fourth speeds in the first, second, third and fourth driving signals in the inverter device 3 is the same as that in the first embodiment. Therefore, when any manner of switching is performed, it is possible to prevent the situation where two or more switch units are on simultaneously.

Figure 8:
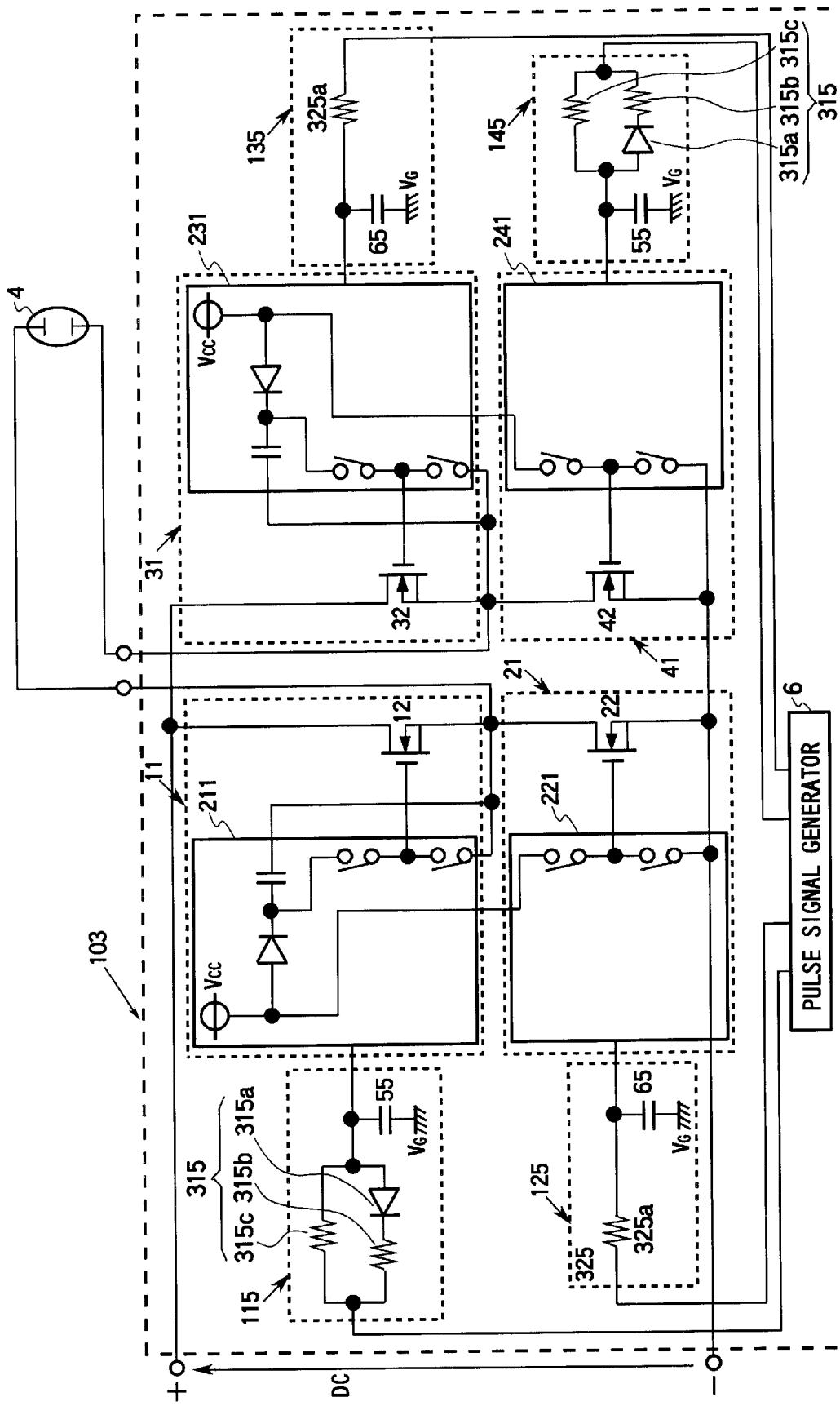
FIG. 8 is a circuit diagram of an inverter device according to the seventh embodiment of the present invention.

FIG. 8 illustrates an inverter device 103 according to the seventh embodiment of the present invention. The inverter device 103 shown in FIG. 8 is different from the inverter device of the sixth embodiment in the first, second, third and fourth driving controllers 115, 125, 135 and 145.

The first driving controller 115 has a resistor element 315 on the pulse signal line. The resistor element 315 has a diode 315a as an exemplary first device group, a resistor 315b having a resistance value $R_{7OFF}$ that is arranged in series to the diode 315a, and a resistor 315c having a resistance value $R_{7ON}$ as an exemplary second device group arranged electrically in parallel to the first device group. The resistor element 315 has a similar arrangement to that of the resistor element 15 of the first driving controller 112 in the second embodiment. The first driving controller 115 further includes a capacitor element 55. The capacitor element 55 has a capacitance $C_{71}$. One end of the capacitor element 55 is connected between the resistor element 315 and the first switch driving unit 211. The other end of the capacitor element 55 is connected to a reference voltage $V_g$. The reference voltage is, for example, a ground potential.

On the other hand, the second driving controller 125 has a resistor element 325 that includes a resistor 325a having a resistance value $R_{72}$ on the pulse signal line. The resistor element 325 has a similar arrangement to that of the resistor element 25 of the second driving controller 121 in the second embodiment. The second driving controller 125 further includes a capacitor element 65. The capacitor element 65 has a capacitance $C_{72}$. One end of the capacitor element 65 is connected between the resistor element 325 and the second switch driving unit 221. The other end of the capacitor element 65 is connected to the reference voltage $V_g$. The reference voltage is, for example, the ground potential.

The resistance values $R_{7ON}$ and $R_{7OFF}$ of the resistor element 315 of the first driving controller 115, the capacitance $C_{71}$ of the capacitor element 55, the resistance value $R_{72}$ of the resistor element 325 of the second driving controller 125, and the capacitance $C_{72}$ of the capacitor element 65 are set to satisfy the following relationship.

$$R_{7ON}C_{71} > R_{72}C_{72} > R_{7T}C_{71} \quad (10)$$

In Equation (10), the equivalent resistance value $R_{7T}$ is $(1/R_{7ON} + 1/R_{7OFF})^{-1}$, as in the second embodiment.

The seventh embodiment corresponds to a modification of the second embodiment obtained by replacing the input capacitance of the FET in the second embodiment with separate capacitor elements in the driving controllers. Please note that Equation (10) in the seventh embodiment corresponds to Equation (4) in the second embodiment. Thus, the third and fourth speeds of the second driving signal are higher than the first speed of the first driving signal but are lower than the second speed of the first driving signal.

The third driving controller 135 has a similar arrangement to that of the second driving controller 125. Also, the fourth driving controller 145 has a similar arrangement to that of the first driving controller 115.

The relationship of the magnitude of the first, second, third and fourth speeds in the first, second, third and fourth driving signals in the inverter device 103 is the same as that in the second embodiment. Therefore, when any manner of switching is performed, it is possible to prevent the situation where two or more switch units are turned on simultaneously.

Figure 9:
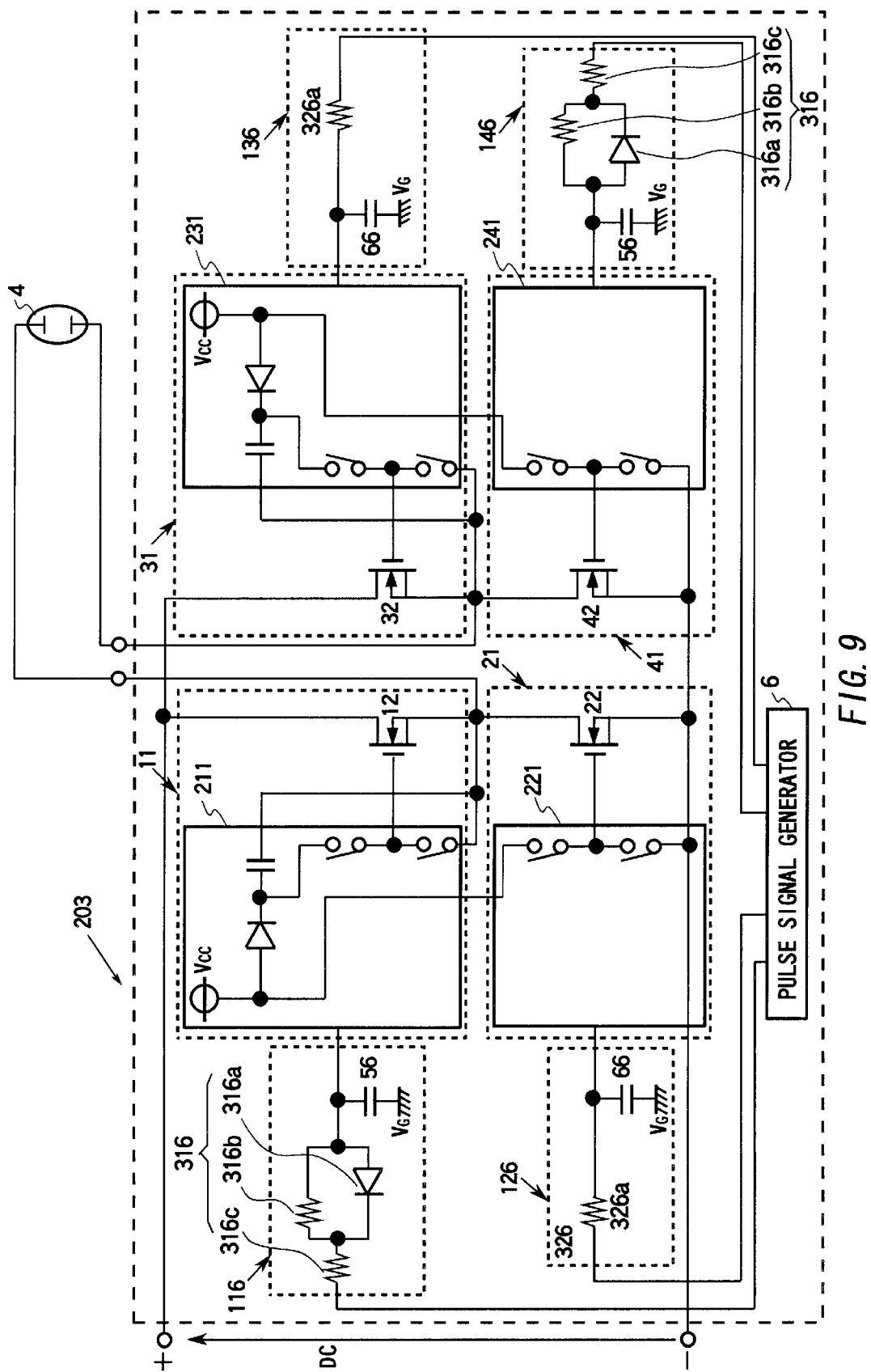
FIG. 9 is a circuit diagram of an inverter device according to the eighth embodiment of the present invention.

FIG. 9 illustrates an inverter device 203 according to the eighth embodiment of the present invention. The inverter device 203 shown in FIG. 9 is different from the inverter device of the sixth embodiment in the first, second, third and fourth driving controllers 116, 126, 136 and 146.

The first driving controller 116 has a resistor element 316 on the pulse signal line. The resistor element 316 includes a diode 316a, a resistor 316b having a resistance value $R_{8ON}$, and a resistor 316c having a resistance value $R_{8OFF}$. The resistor element 316 has a similar arrangement to that of the resistor element 16 of the first driving controller 112 in the third embodiment. The first driving controller 116 further includes a capacitor element 56. The capacitor element 56 has a capacitance $C_{81}$. One end of the capacitor element 56 is connected between the resistor element 316 and the first switch driving unit 211. The other end of the capacitor element 56 is connected to the reference voltage $V_g$. The reference voltage is, for example, the ground potential.

On the other hand, the second driving controller 126 has a resistor element 326 that includes a resistor 326a having a resistance value $R_{82}$ on the pulse signal line. The resistor element 326 has a similar arrangement to that of the resistor element 26 of the second driving controller 122 in the third embodiment. The second driving controller 126 further includes a capacitor element 66. The capacitor element 66 has a capacitance $C_{82}$. One end of the capacitor element 66 is connected between the resistor element 326 and the second switch driving unit 221. The other end of the capacitor element 66 is connected to the reference voltage $V_g$. The reference voltage is, for example, the ground potential.

The resistance values $R_{8ON}$ and $R_{8OFF}$ of the resistor element 316 of the first driving controller 116, the capacitance $C_{81}$ of the capacitor element 56, the resistance value $R_{82}$ of the resistor element 326 of the second driving controller 126, and the capacitance $C_{82}$ of the capacitor element 66 are set to satisfy the following relationship.

$$R_{8T}C_{81} > R_{82}C_{82} > R_{8OFF}C_{81} \quad (11)$$

In Equation (11), the equivalent resistance value $R_{8T}$ is ($R_{8ON}+R_{8OFF}$), as in the third embodiment.

The eighth embodiment corresponds to a modification of the third embodiment obtained by replacing the input capacitance of the FET in the third embodiment with separate capacitor elements in the driving controllers. Please note that Equation (11) in the eighth embodiment corresponds to Equation (6) in the third embodiment. Thus, the third and fourth speeds of the second driving signal are higher than the first speed of the first driving signal but are lower than the second speed of the first driving signal.

The third driving controller 136 has a similar arrangement to that of the second driving controller 126. Also, the fourth driving controller 146 has a similar arrangement to that of the first driving controller 116.

The relationship of the magnitude of the first, second, third and fourth speeds in the first, second, third and fourth driving signals in the inverter device 203 is the same as that in the third embodiment. Therefore, when any manner of switching is performed, it is possible to prevent the situation where two or more switch units are on simultaneously.

Figure 10:
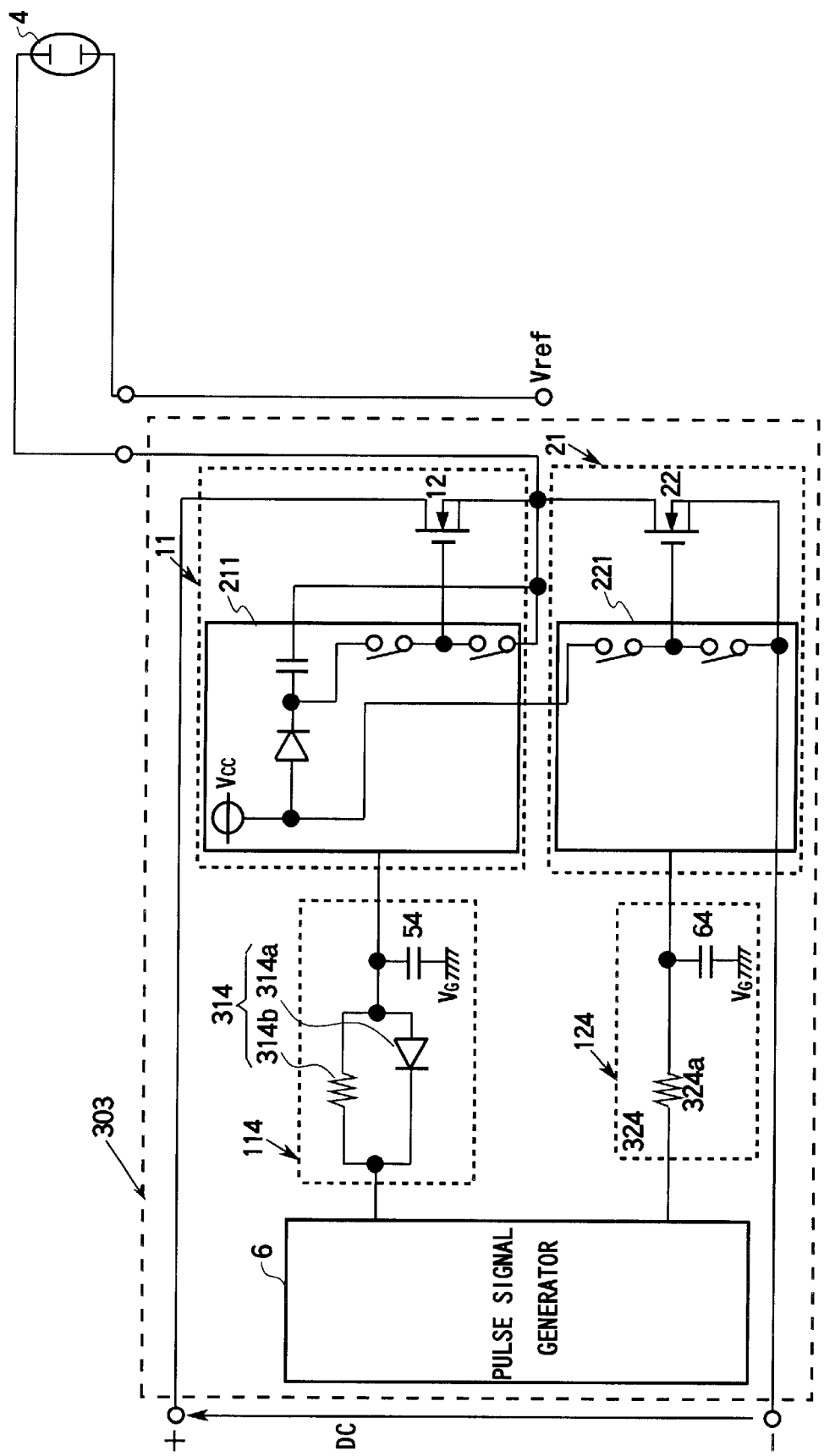
FIG. 10 is a circuit diagram of an inverter device according to the ninth embodiment of the present invention.

FIG. 10 is a circuit diagram of an inverter device 303 according to the ninth embodiment of the present invention. Although the inverter devices of the sixth, seventh and eighth embodiments has the full-bridge including four switch units, the inverter device 303 of the ninth embodiment has a half-bridge arrangement including two switch units.

The inverter device 303 includes the pulse signal generator 6, the first and second switch driving units 211 and 221, the first and second driving controllers 114 and 124, and the first and second switch units 11 and 21. The first and second switch units 11 and 21 are connected in series. One end of this series circuit is connected to the anode of the DC power supply while the other end is connected to the cathode of the DC power supply. One end of the load 4 is connected between the first and second switch units 11 and 21. The other end of the load 4 is connected to the reference voltage $V_{ref}$. This reference voltage $V_{ref}$ is similar to that in the fifth embodiment.

In the ninth embodiment, the first driving controller 114 connected to the first switch unit 11 has the same arrangement as that of the first driving controller 114 in the sixth embodiment. Similarly, the second driving controller 124 connected to the second switch unit 20 has the same arrangement as that of the second driving controller 124 in the sixth embodiment. Thus, the first driving controller 114 generates the first driving control signal that is the same as the first driving signal for driving the first switch unit 11 in the sixth embodiment. Similarly, the second driving controller 124 generates the second driving control signal that is the same as the second driving signal for driving the second switch unit 21 in the sixth embodiment.

Also in the ninth embodiment, the relationship of the magnitude of the first, second, third and fourth speeds in the first and second driving signals is the same as that in the first embodiment. Therefore, when any manner of switching is performed, it is possible to prevent the situation where two or more switch units are on simultaneously.

In the inverter device of the ninth embodiment, the first and second driving controllers are arranged to have the same arrangements as those in the sixth embodiment, respectively. However, the present invention is not limited thereto. The first and second driving controllers connected to the first and second switch units in the half-bridge arrangement may be the first and second driving controllers in any of the seventh and eighth embodiments.

According to the inverter device of the first through ninth embodiments, it is possible to prevent two or more switch units from being turned on with a reduced number of parts.

Moreover, although the first driving controller is provided for the first switch unit while the second driving controller is provided for the second switch unit, the present invention is not limited thereto. Instead, the similar arrangement to the second driving controller may be provided for the first switch unit while the similar arrangement to the first driving controller may be provided for the second switch unit. In a case of the full-bridge arrangement, in addition to the above, the similar arrangement to the first driving controller is provided for the third switch unit, while the similar arrangement to the second driving controller is provided for the fourth switch unit.

In the above embodiments, the FET is used as the main switch of the switch unit. However, the present invention is not limited thereto. As another exemplary main switch of the switch unit, an IGBT can be considered.

An example of the application of the inverter device according to the first through ninth embodiments is a lighting circuit unit for an in-vehicle discharge lamp. Especially in this case, the situation where two or more switch units are on simultaneously by a simple structure and therefore the demand for simplifying the structure of the lighting circuit unit and reducing the size can be satisfied.

As is apparent from the above description, according to the present invention, it is possible to prevent two or more switch units from being in the on state simultaneously by a simple structure using a reduced number of parts.

Although the present invention has been described by way of exemplary embodiments, it should be understood that those skilled in the art might make many changes and substitutions without departing from the spirit and the scope of the present invention which is defined only by the appended claims.

What is claimed is:

1. An inverter device, including a first series circuit having first and second switch units connected in series and a pulse signal generator operable to generate a pulse signal, for supplying an alternating voltage to a load by alternately driving said first and second switch units to be turned on and off in accordance with said pulse signal while a direct voltage is applied to said series circuit, said inverter device comprising:

a first driving controller operable to generate a first driving signal and to drive said first switch unit based on said first driving signal, said first driving signal rising with a first speed at a rising of said pulse signal in a direction for turning on said first switch unit and falling with a second speed at a falling of said pulse signal in a direction for turning off said first switch unit, said second speed being higher than said first speed; and a second driving controller operable to generate a second driving signal and to drive said second switch unit based on said second driving signal, said second driving signal falling with a third speed at said rising of said pulse signal in said direction for turning on said first switch unit and rising with a fourth speed at said falling of said pulse signal in said direction for turning off said first switch unit, said third and fourth speeds being between said first and second speeds.

2. An inverter device as claimed in claim 1, wherein said load is connected between said first and second switch units at one end and is connected to a reference potential at the other end.

3. An inverter device as claimed in 1 or 2, wherein said first driving controller includes a resistor element provided on a line of said pulse signal and a capacitor element connected between said resistor element and said first switch unit at one end, said second driving controller includes a resistor element provided on the line of said pulse signal and a capacitor element connected between said resistor element of said second driving controller and said second switch unit at one end, and a first product of an equivalent resistance value of said resistor element of said first driving controller with respect to an electric current seen from the direction for turning on said first switch unit and a capacitance of said capacitor element is larger than a second product of an equivalent resistance value of said resistor element of said second driving controller with respect to an electric current seen from the direction for turning off said second switch unit and a capacitance of said capacitor element.

4. An inverter device as claimed in 1 or 2, wherein said first driving controller includes a resistor element provided on a line of said pulse signal and a capacitor element connected between said resistor element and said first switch unit at one end, said second driving controller includes a resistor element provided on the line of said pulse signal and a capacitor element connected between said resistor element of said second driving controller and said second switch unit at one end, and a third product of an equivalent resistance value of said resistor element of said first driving controller with respect to an electric current seen from the direction for turning off said first switch unit and a capacitance of said capacitor element is smaller than a fourth product of an equivalent resistance value of said resistor element of said second driving controller with respect to an electric current seen from the direction for turning on said second switch unit and a capacitance of said capacitor element.

5. An inverter device as claimed in any one of claims 1 to 4, wherein said first switch unit includes a first main switch and a first switch driving unit operable to drive said first main switch in accordance with said first driving signal, and said second switch unit includes a second main switch and a second switch driving unit operable to drive said second main switch in accordance with said second driving signal.

6. An inverter device as claimed in claim 1, further comprising:

a second series circuit, arranged in parallel to said first series circuit, including a third switch unit and a fourth switch unit;

a third driving controller operable to generate a third driving signal based on said pulse signal and to drive said third switch unit based on said second driving signal, said third driving signal falling with said third speed at the rising of said pulse signal in the direction for turning on said first switch unit and rising with said fourth speed at the falling of said pulse signal in the direction for turning off said first switch unit; and a fourth driving controller operable to generate a fourth driving signal and to drive said fourth switch unit based on said first driving signal, said fourth driving signal rising with said first speed at the rising of said pulse signal in the direction for turning on said first switch unit and falling with said second speed at the falling of said pulse signal in the direction for turning off said first switch unit, wherein said load is connected between said first and second switch units at one end and is connected between said third and fourth switch units at the other end, and a pair of said first and fourth switch units and a pair of said second and third switch units are alternately driven to be turned on and off in accordance with the first, second, third and fourth driving signals.

7. An inverter device as claimed in claim 6, wherein said first driving controller includes a resistor element provided on a line of said pulse signal and a capacitor element connected between said resistor element and said first switch unit at one end, said second driving controller includes a resistor element provided on the line of said pulse signal and a capacitor element connected between said resistor element of said second driving controller and said second switch unit at one end, said third driving controller includes a resistor element provided on the line of said pulse signal and a capacitor element connected between said resistor element of said third driving controller and said third switch unit at one end, said fourth driving controller includes a resistor element provided on the line of said pulse signal and a capacitor element connected between said resistor element of said fourth driving controller and said fourth switch unit at one end, a first product of an equivalent resistance value of said resistor element of said first driving controller with respect to an electric current seen from the direction for turning on said first switch unit and a capacitance of said capacitor element of said first driving controller is larger than a second product of an equivalent resistance value of said resistor element of said second driving controller with respect to an electric current seen from the direction for turning off said second switch unit and a capacitance of said capacitor element of said second driving controller, and a third product of an equivalent resistance value of said resistor element of said fourth driving controller with respect to an electric current seen from the direction for turning on said fourth switch unit and a capacitance of said capacitor element of said fourth driving controller is larger than a fourth product of an equivalent resistance value of said resistor element of said third driving controller with respect to an electric current seen from the direction for turning off said third switch unit and a capacitance of said capacitor element of said third driving controller.

8. An inverter device as claimed in claim 6, wherein said first driving controller includes a resistor element provided on a line of said pulse signal and a capacitor element connected between said resistor element and said first switch unit at one end, said second driving controller includes a resistor element provided on the line of said pulse signal and a capacitor element connected between said resistor element of said second driving controller and said second switch unit at one end, said third driving controller includes a resistor element provided on the line of said pulse signal and a capacitor element connected between said resistor element of said third driving controller and said third switch unit at one end, said fourth driving controller includes a resistor element provided on the line of said pulse signal and a capacitor element connected between said resistor element of said fourth driving controller and said fourth switch unit at one end, a fifth product of an equivalent resistance value of said resistor element of said first driving controller with respect to an electric current seen from the direction for turning off said first switch unit and a capacitance of said capacitor element of said first driving controller is smaller than a sixth product of an equivalent resistance value of said resistor element of said second driving controller with respect to an electric current seen from the direction for turning on said second switch unit and a capacitance of said capacitor element of said second driving controller, and a seventh product of an equivalent resistance value of said resistor element of said fourth driving controller with respect to an electric current seen from the direction for turning off said fourth switch unit and a capacitance of said capacitor element of said fourth driving controller is smaller than an eighth product of an equivalent resistance value of said resistor element of said third driving controller with respect to an electric current seen from the direction for turning on said third switch unit and a capacitance of said capacitor element of said third driving controller.

9. An inverter device as claimed in any one of claims 6 to 8, wherein said first switch unit includes a first main switch and a first switch driving unit operable to drive said first main switch in accordance with said first driving signal, said second switch unit includes a second main switch and a second switch driving unit operable to drive said second main switch in accordance with said second driving signal, said third switch unit includes a third main switch and a third switch driving unit operable to drive said third main switch in accordance with said third driving signal, and said fourth switch unit includes a fourth main switch and a fourth switch driving unit operable to drive said fourth main switch in accordance with said fourth driving signal.

* * * * *